United States Patent Office 3,201,942
Patented Aug. 24, 1965

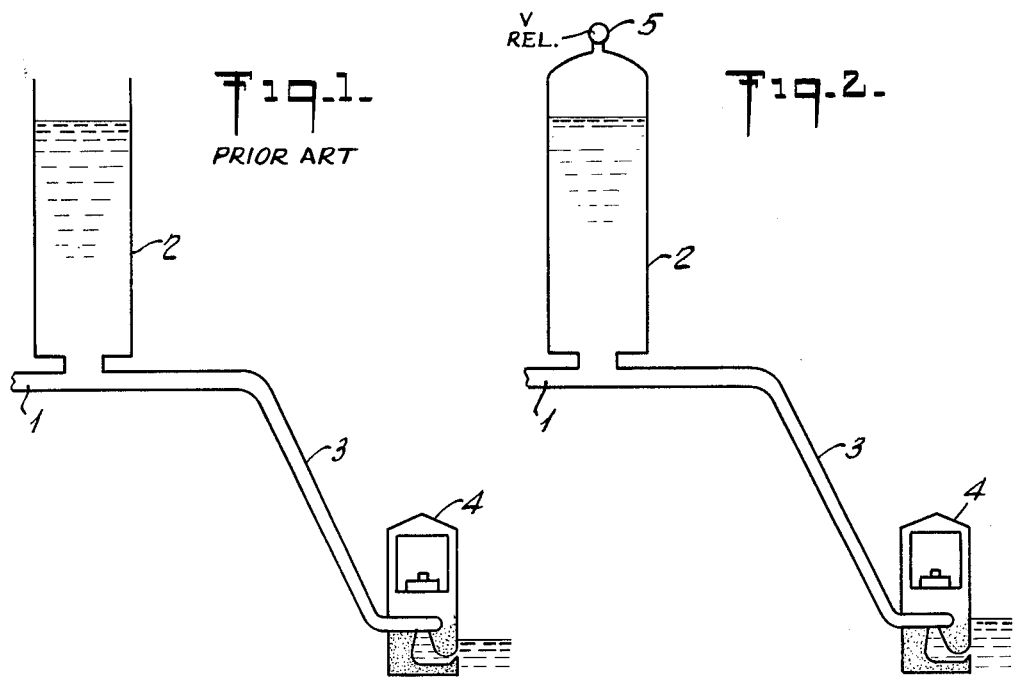
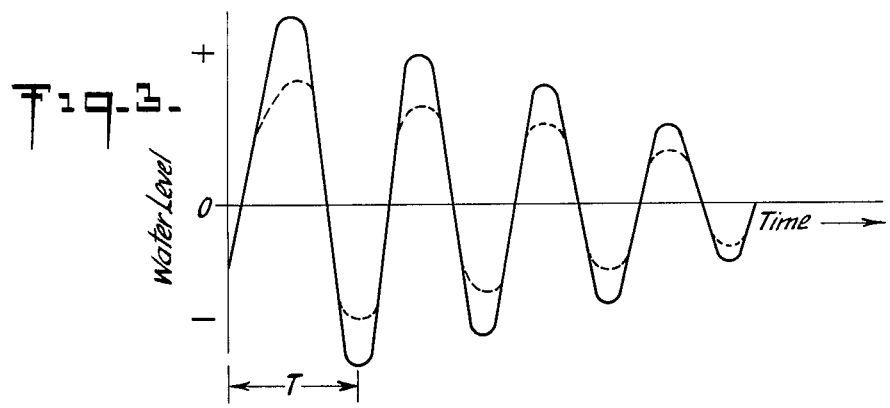
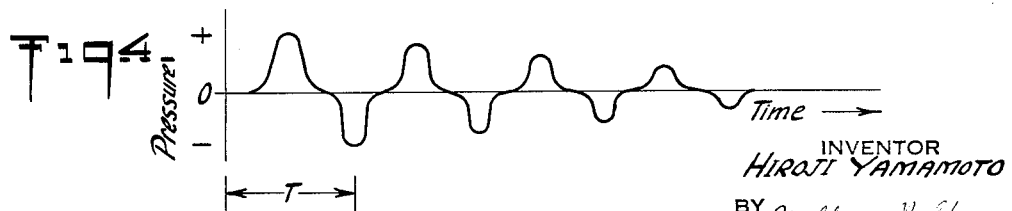

3,201,942
CLOSED SURGE TANK
Hiroji Yamamoto, 88 Isobe-machi, Toyama-shi, Japan
Filed Oct. 6, 1961, Ser. No. 143,492
Claims priority, application Japan, Oct. 20, 1960, 42,805
7 Claims. (Cl. 61—19)

The invention is in regard to a surge tank to be installed at the starting point of the penstock of a hydroelectric plant. The features of the surge tank are the closing up of its upper part and installing a suitable air valve on it.

The purpose of this invention is to make a surge tank which will minimize the change of water level in the water tank caused by the pressure of air within the surge tank; enable the surge tank to be made smaller in size; reduce its construction cost; and also to facilitate the succeeding operation at the plant.

In the conventional type hydroelectric plant having a reservoir, the waterway has as much pressure as the available depth of the dam and thereby becomes a pressure waterway. Therefore if the waterway is fairly long, a surge tank is installed near the starting point of the penstock to provide a free level and to absorb the water hammer. By means of frictional resistance of the waterway and water tank, the oscillation of surging waves within the tank gradually decreases and returns to a normal condition.

There are many types of conventional surge tanks such as simple, differential, chamber, restricted orifice surge tanks, etc. When the load is suddenly cut off in a conventional type surge tank, the water hammer is reflected on the water surface of the water tank and would not cause any more pressure increase within the penstock. Also, when the load is suddenly increased the water within the water tank would temporarily supply the penstock so that it would not cause abnormal pressure decrease within the penstock. For sudden stoppage or increase of the load, the water level in the tank would first rise and respectively drop, and cause the water surface considerably to oscillate. Due to the frictional resistance of the waterway, however, the oscillation would gradually diminish and settle to a fixed level. The tank is required to be of a size which complies with Thoma's stable requirements which would make the cross section of the water tank disproportionately large compared with the waterway, making its construction cost very high and also it requires scores of minutes for declination of the oscillation in the tank.

This invention relates to a closed surge tank which is made by closing up the upper part of any of the aforementioned many types of surge tanks and also equipping the tank with a suitably dimensioned air valve. The purpose of this closed surge tank is to minimize the change of water level by utilizing the action of the air within the water tank and reducing its size.

By means of the accompanying drawing, the operation of this invention is explained. In the drawing, FIGURE 1 shows the cross section of an ordinary simple surge tank used at a hydro-electric plant (prior art);

FIGURE 2 shows the cross section of a similar closed surge tank according to this invention;

FIGURE 3 shows the comparative water level-change curves of a simple surge tank and the closed surge tank; and FIGURE 4 shows the change of air pressure within the closed surge tank during surging action.

In FIGURES 1 and 2, 1 shows a waterway; 2, a surge tank; 3, a penstock; 4, a generating plant; in FIGURE 2, 5 is an air valve installed on the upper part of the surge tank. When the water level rises in the water tank, 2 when surging operation is going on, the water level rises easily at first because there is no restraint, but as the water level rises higher the amount of air discharged from the air valve 5 can not keep pace with the rise of the water level.

Consequently, as is shown in FIGURE 4, the air pressure in the tank 2 would gradually rise and act to prevent the rise of the water level. When the rise of the water level begins, friction of the waterway would also increase and on top of that the resistance of air in the tank 2 gradually slows down the rise of the water level. In FIGURE 3, the full lines indicate the change of the water level in a simple surge tank. The change of the water level would produce the dotted line shown in FIGURE 3, plotting a sine-curve and reaching its maximum. The diameter of the air valve 5 should be determined so as to make the air pressure in the tank to be below $+1.0$ kg./cm.$^2$ at this point.

When the water level reaches its highest point it would gradually drop again. As the water level becomes lower, the air that was discharged through the air valve 5 undergoes a change; the valve gradually begins to suck in air. Since the suction of air through the valve cannot keep pace with the lowering of the water level, the air in the tank would gradually become rarefied and at its lowest, the air pressure would reach a value of around $-1.0$ kg./cm.$^2$.

The closed surge tank of this invention works to prevent the rise of the water level by the action of air pressure when the water level nears its maximum point, and when it nears its lowest point, negative pressure gradually acts to prevent the lowering of the water level. As to the change of the water level due to surging operation, owing to the restraint of air passing through the air valve 5, when the water level reaches its highest or lowest point, the action of air in the tank is as shown by FIGURES 3 and 4, working to prevent the change of water surface and to minimize the change of water level in the water tank.

The size of the air valve 5 to be installed on the water tank 2 is to be determined by experiments and calculations but it is best to make the speed of air passing through the air valve 5 to be approximately the speed of sound. In this condition there is not much change in the frequency of oscillation. Also for the water hammer caused by sudden stoppage of the turbine the air valve 5 on the surge tank of this invention does not give any trouble. In the surge tank of this invention, the change of water level in the water tank 2 becomes small and the highest and lowest limits of surging waves also become small so that declination time of surging will be shortened. Consequently when comparing the water tank 2 with the conventional type, its cross section and height can be reduced so that it becomes smaller in size. Since the cost of closing up the top of the tank is slight, the construction costs of the water tank can be considerably lessened; and by shortening the declination time of surging, the succeeding operation at the power generating plant is made easier; all these points of effectiveness show that this invention is very useful.

What I claim is:

1. A hydraulic surge tank, comprising a chamber communicating with a hydraulic line carrying a fluid under pressure, said line being subject to sudden fluid surges owing to quick increase and decrease of said pressure, a cover for closing said chamber in a fluid-tight manner, said chamber being partly filled with said fluid, and a two-way relief air valve in said cover, said valve being continually open under normal circumstances of use so as to communicate with the space within said chamber and with the atmosphere, and being set to a predetermined pressure lower than that to which said line may be subjected, whereby said surges are effectively dampened by a pneumatic braking effect resulting from a controlled amount of air which passes outward and inward, respectively, through said valve during the use of the surge tank, depending on the direction and amount of said surges.

2. A surge tank as defined in claim 1, wherein said air passing through the valve is set to a flow value corresponding substantially to the speed of sound, based on the fact that the speed of air equals the ratio of the column of air passing through said valve and the area of said valve, said area being assumed to be constant.

3. A surge tank as defined in claim 1, wherein said predetermined pressure of the valve is set so as to maintain air in said space within the limits of minus and plus one kilogram per square centimeter.

4. A surge tank as defined in claim 1, wherein the sectional area of said valve is such that the maximum air speed passing therethrough is less than one mach.

5. A surge tank for hydraulic applications, comprising a chamber communicating with an upper portion of a penstock and adapted to be filled with the water guided under varying pressure to a hydraulic plant, a cover closing said chamber in a water- and air-tight manner, and a two-way relief air valve in said cover, continually communicating with the atmosphere and with the space within said chamber, and set to a predetermined pressure, a compressible and expandable air cushion of varying volume being formed in said chamber above said water, whereby sudden changes in water level within said chamber are dampened by the pneumatic braking effect of said air cushion, the volume of the latter being changed by a controlled amount of air passing through said valve depending upon the changes of said water pressure in said upper penstock portion.

6. A surge tank as defined in claim 5, wherein said predetermined pressure of the valve is set so that the speed of the air passing therethrough substantially corresponds to that of sound.

7. A surge tank as defined in claim 5, wherein said predetermined pressure of the valve is set so as to maintain air pressure in said chamber within the limits of minus and plus one kilogram per square centimeter.

References Cited by the Examiner

UNITED STATES PATENTS

| | | |
|---|---|---|
| Re. 18,969 | 10/33 | Foulds. |
| 962,355 | 6/10 | Johnson. |
| 973,183 | 10/10 | Fanning. |
| 1,549,260 | 8/25 | Johnson _____ 61—19 |
| 1,689,947 | 10/28 | Johnson _____ 61—19 |
| 1,705,089 | 3/29 | Kamuller _____ 61—19 |
| 1,808,209 | 6/31 | Earl _____ 137—568 |
| 1,863,728 | 6/32 | Porter _____ 61—19 |
| 1,995,299 | 3/35 | Foulds _____ 137—71 |
| 2,271,480 | 1/42 | Gibson _____ 61—19 |
| 2,416,025 | 2/47 | Shaff _____ 138—26 |

FOREIGN PATENTS 292,940 7/16 Germany.

EARL J. WITMER, *Primary Examiner*.

M. CARY NELSON, JACOB SHAPIRO, JACOB L. NACKENOFF, *Examiners*.